(No Model.) 3 Sheets—Sheet 1.
J. H. MITCHELL.
MACHINE FOR SHEETING DOUGH.
No. 576,373. Patented Feb. 2, 1897.
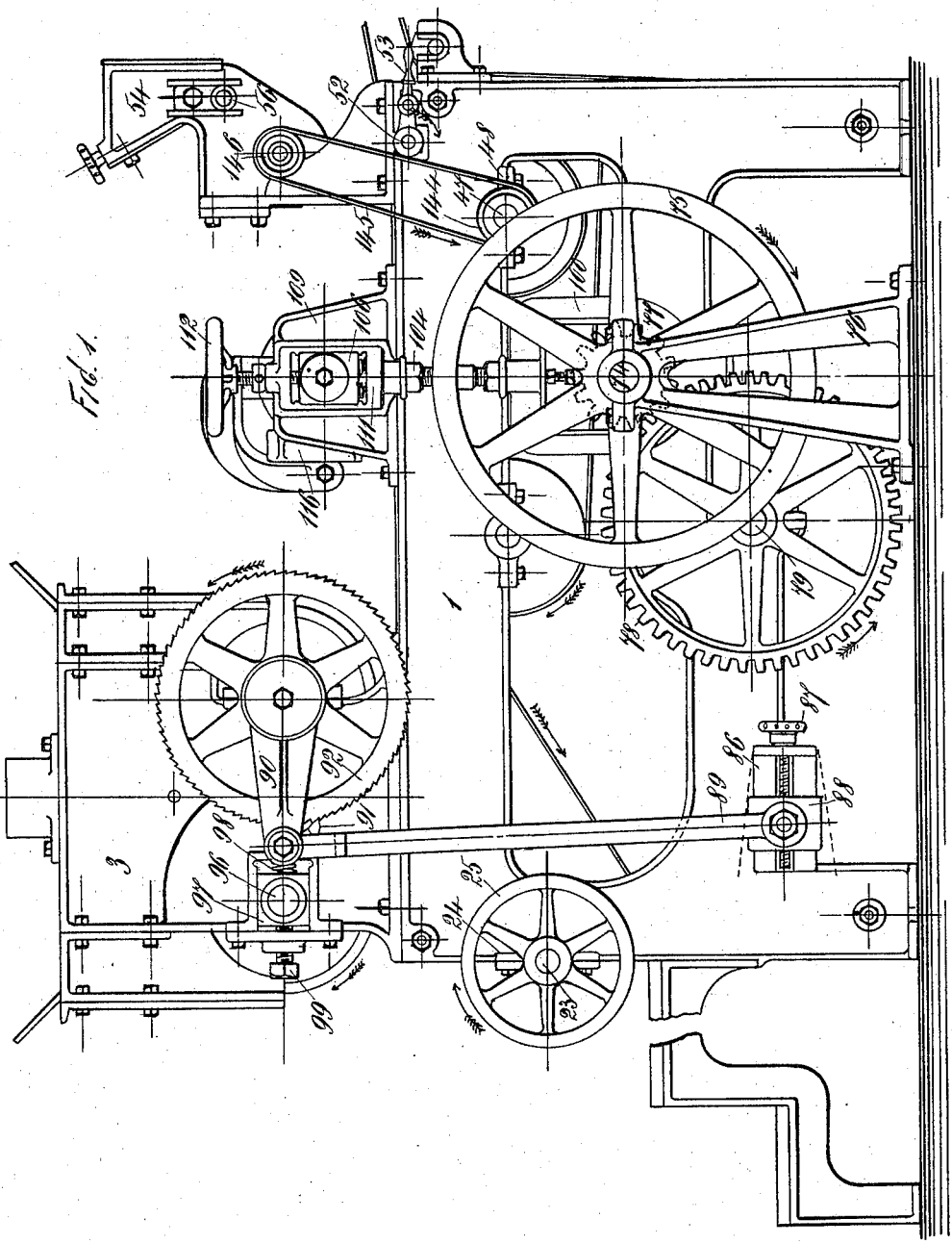
WITNESSES:
Wm H Wightman
Lillian B. Hubbard
INVENTOR
James H. Mitchell
BY A. M. Pierce,
ATTORNEY.

(No Model.) 3 Sheets—Sheet 2.
J. H. MITCHELL.
MACHINE FOR SHEETING DOUGH.
No. 576,373. Patented Feb. 2, 1897.
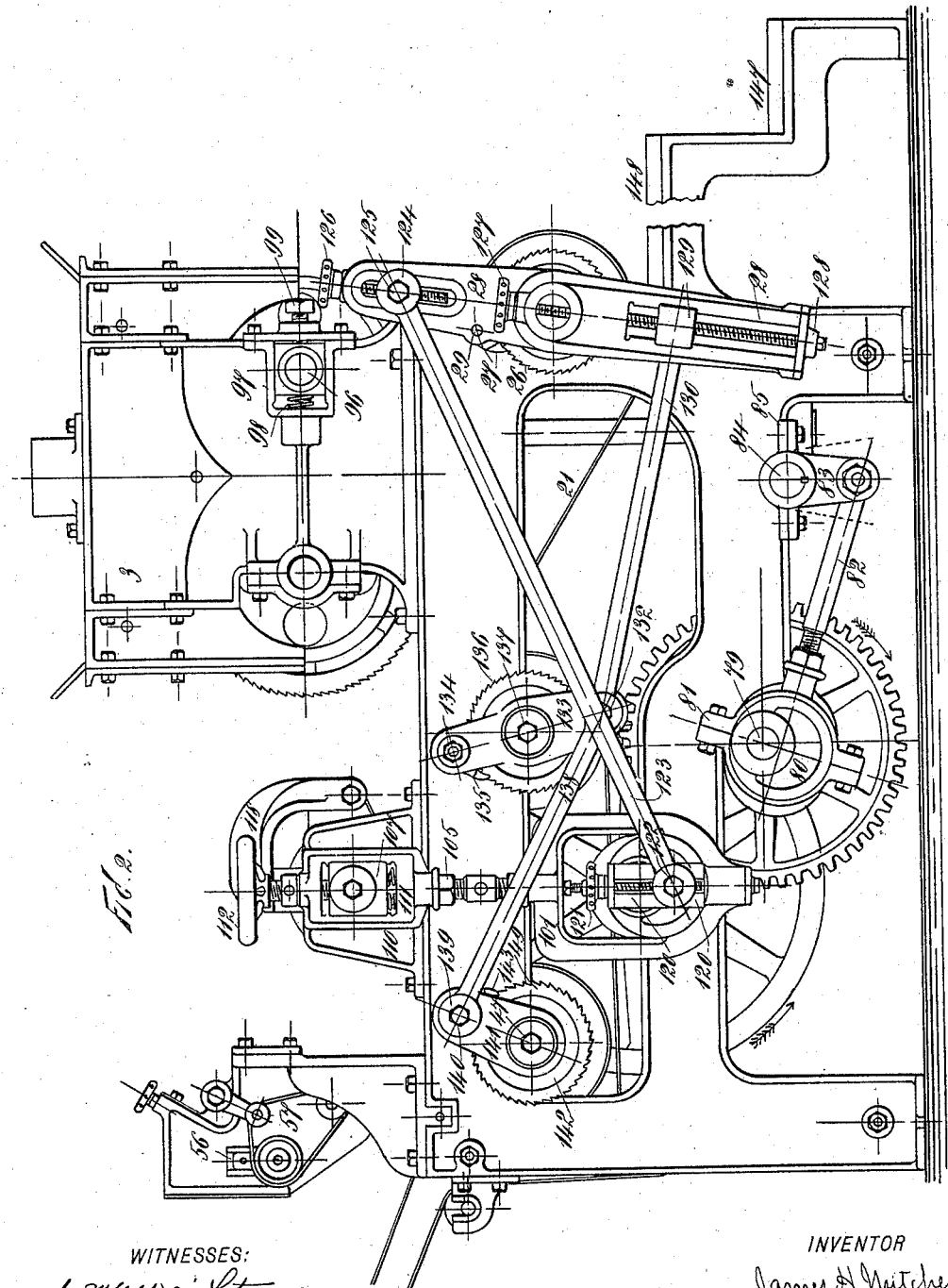
WITNESSES:
W. H. Weightman
Lillian B. Hubbard
INVENTOR
James H. Mitchell
BY A. M. Pierce,
ATTORNEY.

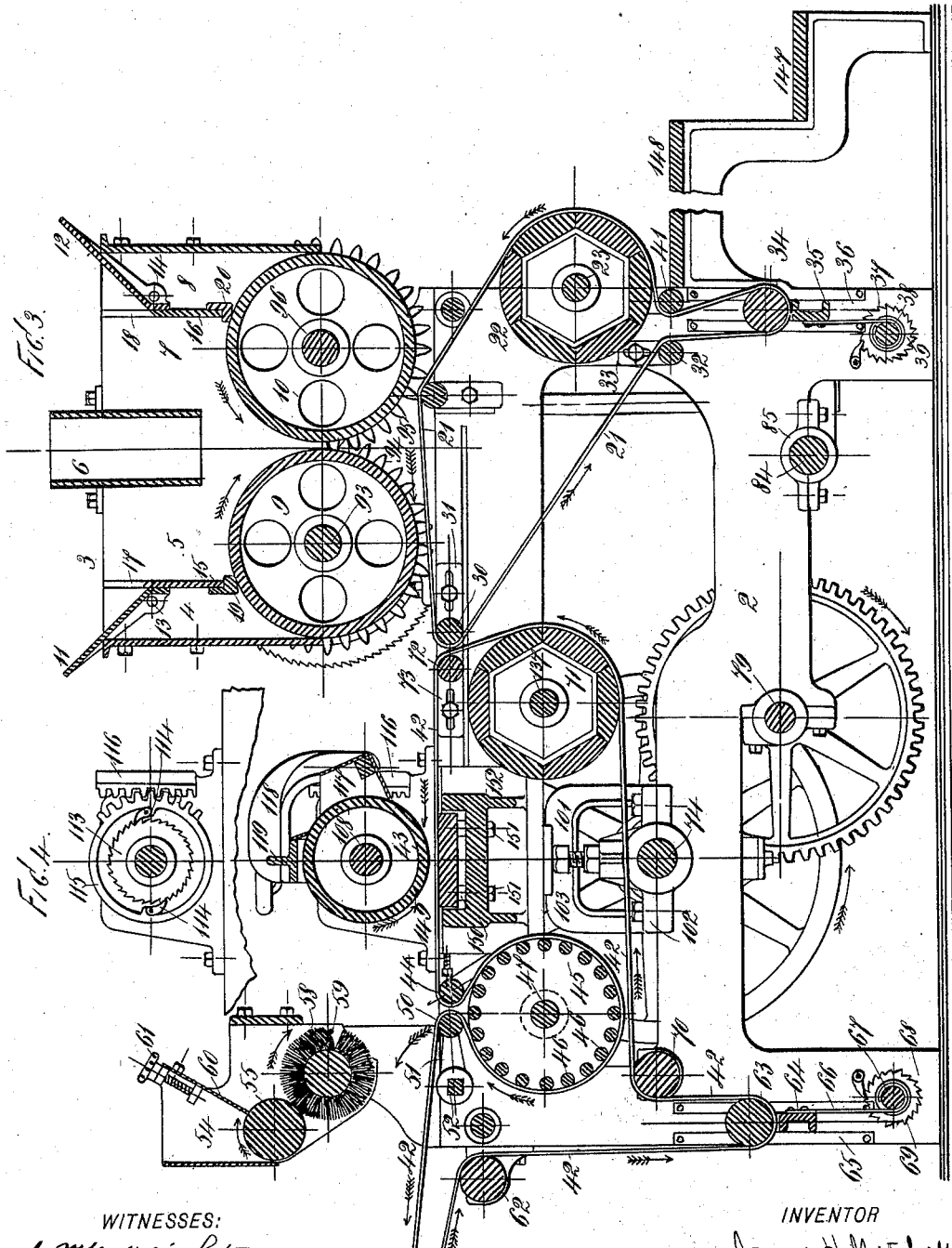

UNITED STATES PATENT OFFICE.

JAMES H. MITCHELL, OF PHILADELPHIA, PENNSYLVANIA.

MACHINE FOR SHEETING DOUGH.

SPECIFICATION forming part of Letters Patent No. 576,373, dated February 2, 1897.

Application filed July 30, 1894. Serial No. 518,965. (No model.)

*To all whom it may concern:*

Be it known that I, JAMES H. MITCHELL, a citizen of the United States, residing in Philadelphia, Philadelphia county, State of Pennsylvania, have invented a new and useful Improvement in Machines for Sheeting Dough, of which the following is a specification.

My invention relates especially to machinery employed for forming dough into sheets, and has for its object the making of a continuous sheet of dough and at the same time to place centrally in the sheet of dough what is known as "scrap" and automatically feed the completed sheet to any form of biscuit-cutting machine.

To attain the desired end, my invention consists, essentially, in certain novel and useful combinations or arrangements of parts and peculiarities of construction and operation, all of which will be hereinafter first fully described, and then pointed out in the claims.

Reference being made to the accompanying drawings, forming a part hereof, Figure 1 is a side elevation of the machine, showing the application of the motive power. Fig. 2 is a side elevation of the machine opposite to that shown in Fig. 1, illustrating the application of motion to the different carriers, &c. Fig. 3 is a vertical longitudinal central section of the machine, showing all the internal working parts. Fig. 4 is a detached view of mechanism for operating the roller 43.

Like numerals of reference, wherever they occur, indicate corresponding parts in all the figures.

The functions performed by my machine are three in number. Starting with the lump and scrap dough, these are made into a rough sheet form, having the scrap inclosed by the fresh dough forming the top and bottom of the sheet. This sheet is then carried forward automatically to that portion of the machine designed for thoroughly incorporating or kneading the sheet by the action of a vertically-moving stamping-roll, having a yielding bed located therebeneath. The last-named function performed by the machine reduces the sheet to the desired thickness required for the subsequent cutting into biscuits. The third function performed by the machine is that of automatically dusting both the top and bottom of the sheet of dough as it passes out of the sheeting-machine toward the biscuit-cutting machine.

The adjustments of the different carriers and feed-motions are so arranged as to admit of free manipulation while the machine is in motion. All the carriers are provided with tightening devices, which may also be regulated while the machine is in motion. The functions performed by the different parts of this machine render it entirely automatic, requiring little or no human attention, thereby insuring a more perfect sheet of dough than could possibly be produced by hand.

In Fig. 1, 1 represents the side of the main frame of the machine, which is so shaped as to carry all the necessary bearings. The opposite side of the frame, Fig. 2, is a reproduction of 1. 3 represents the preliminary dough-sheeting apparatus, the upper portion of which is divided into five compartments, numbered, respectively, 4, 5, 6, 7, and 8, as particularly illustrated in Fig. 3. The centrally-located compartment 6 is for holding scrap dough, while compartments 5 and 7 are for holding fresh lump dough. Compartments 4 and 8 are flour-holders for automatically supplying flour to the surface of the sheeting-rolls 9 and 10. These flour-compartments 4 and 8 have inclined lids or covers 11 and 12, which are pivoted upon bearings 13 and 14, and perform the double function of covering the flour-holders, and also forming the inclined sides of the hopper of the dough-compartments 5 and 7.

As will be observed in Fig. 3, the lids 11 and 12 are closed, and in operating them they move in the direction of the arrows, and when opened they admit freely the flour it is desired to supply to the compartments 4 and 8. The right and left hand sides of the respective flour-compartments 4 and 8 are formed by two sliding plates 15 and 16. These plates are held and guided at their ends by vertical slots 17 and 18, while upon the lower edge of each plate 15 and 16 is a wooden shoe 19 and 20, which comes in close contact with the peripheries of the sheeting-rolls 9 and 10, the weight of the side plates being supported by the rolls. These rolls rotate in the direction indicated by the arrows, Fig. 3, and their entire surface is covered with fine or minute corrugations, too minute for illustration in the drawings. The function of these fine corrugations is to receive and firmly hold the dry powdered flour, said flour being taken from the chambers 4 and 8, the bottoms of these chambers being formed by the peripheries of the sheeting-rolls 9 and 10, the flour resting upon the rolls. As the rolls rotate the fine flour is well packed and rubbed into the grooves or corrugations in the surface of the rolls by means of the wooden shoes 19 and 20, held in contact with the rolls by gravity. The surface of the sheeting-rolls after passing from the flour-chambers is composed of alternate spaces of flour and metal, which presents to the fresh lump dough a positive non-adhesive surface. The lump dough is carried downward into the angle formed by the peripheries of the two sheeting-rolls 9 and 10, thereby making it into a sheet form. As the scrap dough in chamber 6 is resting upon the lump dough in the chambers 5 and 7, all three chambers feed their respective contents down between the sheeting-rolls simultaneously as they rotate.

The area of the scrap-compartment is about one-half the area of the lump-dough compartments. This will insure a proper distribution of the scrap dough into the center of the lump dough in exact proportion to the respective hoppers. A continuation of the sheeting-rolls 9 and 10 will finally deposit a sheet of dough upon the carrier 21, located below the said rolls and traveling in the direction indicated by the arrows. The application of the power to these sheeting-rolls will be hereinafter described. The carrier 21 receives motion from a drum 22. This drum is mounted upon a shaft 23, journaled in bearings 24, located in the frame 1 of the machine. Upon one end of the shaft 23 is a hand-wheel 25, the object of which is to give independent rotation to the driving-drum 22 and the carrier 21 when so desired. Upon the extremity of the shaft 23, opposite to the wheel 25, is a ratchet-wheel 26. This ratchet-wheel 26 engages with a pawl 27, which is mounted upon a rock-arm 28, to which it is fastened by means of a stud 29. The rock-arm 28 receives an oscillating movement, whereby an intermittent motion is imparted to the shaft 23, and consequently to the drum 22, which propels the carrier 21. The oscillating movement of the rock-arm 28 will be hereinafter described. The carrier 21 after passing from under the sheeting-rolls 9 and 10 is guided by the roller 30, mounted in two adjustable bearings 31, one at each end of the frame 1. The object of these adjustable bearings 31 is to prevent the carrier 21 working to one side or to the other of the machine. Passing from the roller 30 the carrier 21 is guided by a roller 32. This roller is also mounted upon adjustable bearings 33, located in the frame 1 of the machine. The carrier 21, passing from the roller 32, next comes in contact with a tightening slide-roller 34, journaled in a sliding frame 35, mounted in two parallel slideways 36, located upon each side of the frame 1. Secured to the slide-frame 35 is a strap 37, which is wound upon a shaft 38, having its bearings in the main frame 1. Located upon one end of the shaft 38, close to the main frame, is a ratchet-wheel 39, engaging with a pawl 40, which prevents movement of the shaft in one direction and the consequent slackening of the tightening-roll 34. Continuing the line of movement of the carrier 21, it now moves vertically from the tightening-roller 34 to a guide-roller 41, rotating in bearings upon the main frame 1. Passing from the roller 41 it again comes in contact with the driving-drum 22. The dough form, resting upon the upper portion of the carrier 21, passes from this carrier to a second carrier 42, traveling in the same direction. The form is now brought by the second carrier under the stamping or kneading roll 43, which has a compound motion, composed of a vertically-upward movement, while the roll is stationary upon its axis, and when the descent of the roll is made upon the sheet of dough the roll rotates in the direction of the arrow for a short distance. The object of this compound motion is to perform a twofold function upon the dough sheet, that of kneading and also of reducing the thickness of the sheet. This rotary motion works back in a positive manner the surplus dough against the line of travel of the carrier 42, so that the finished sheet of dough passes from under the roll of a uniform thickness without any ridges, which would otherwise be formed upon the sheet without the before-mentioned rotary motion.

149 is a depressible bed mounted upon a plate 152, passing between the sides of the main frame 1. 151 are guide-bolts for said plate, and 150 represents a strip of rubber or other yielding material located between the bed 149 and the supporting-plate 152. This construction gives a yielding support for the sheet of dough as it passes beneath the roll 43, materially assisting in the kneading and sheeting process.

The sheet of dough, after passing from under the stamping or kneading roll 43, is carried toward a roller 44, having its bearings in the main frame of the machine. At this point the carrier 42 passes away from the dough sheet resting upon its surface around a flour-drum 45, said drum being composed of a number of parallel bars 46, forming the periphery of the drum, and so arranged that the flour within the drum passes freely between them, resting upon or coming in contact with the carrier 44, thereby thoroughly dusting or flouring its upper surface, it being understood that this carrier 44 completely incases the flour-drum 45 and prevents the escape of the flour. The heads or ends of the flour-drum are made solid, the ends of the bars 46 being riveted in these heads. Passing through the center of the drum 45 is a shaft 47, to which the drum is secured. This shaft is mounted in bearings 48 in the main frame 1. Upon the end of the shaft 47 is a ratchet-wheel 49, which gives motion to the drum 45, as will hereinafter be described. The carrier 42 passes from the flour-drum around a guide-roller 50, mounted upon arms or bearings 51, fastened to a square shaft 52, journaled in the main frame 1. Upon the end of the shaft 52 is a hand-lever 53. By turning this hand-lever downward the roller 50 will be raised, thereby opening the upper portion of the flour-drum, so that flour can be supplied by passing it to the interior of the drum between the bars 46, after which the roller 50 is returned to its working position.

It will be readily understood that the carrier 42 in passing around the flour-drum 45 must be thoroughly dusted with flour upon its upper surface, and as this carrier after passing the roller 50 again receives the sheet of dough it will transfer a portion of the flour to the lower side of the sheet, it being very essential that the sheet shall not adhere to the gaging-rolls upon the cutting-machine, to which it is afterward transferred by the carrier 42. It is also highly desirable that the upper surface of the sheet of dough should be thoroughly dusted with flour, which is done by an automatic flouring device composed of a flour-hopper, a distributing-roller, and a dusting-brush.

54 is the flour-hopper, the bottom of which is formed by a distributing-roller 55, which rotates in slide-bearings 56, fastened to the sides of the flour-hopper 54. Upon the extremity of the roller 55, beyond the bearing 56, is fastened a pulley 57, which gives motion to the roller 55, as hereinafter explained.

In close contact with the roller 55 is a dusting-brush 58, which in rotating transfers from the roller 55 all flour that may adhere to it. This flour is held loosely among the bristles of the brush, which comes in contact with the bar 59, where they are slightly bent in a backward direction from the line of travel. When they finally pass the bar 59, they resume their normal position very quickly, owing to their elasticity, and thereby cause the flour adhering to the bristles to be thrown off by this elastic rebound. The flour being thus liberated falls down upon the sheet of dough resting upon the carrier 42, thereby covering the upper surface of the sheet with a fine dust.

In order to regulate the amount of flour passing from the hopper 54, there is provided a sliding plate 60, having an adjusting-screw 61, and as this adjustment makes more or less opening between the distributing-roller 55 and the slide-plate 60 any desired amount of flour may be carried out by the distributing-roller.

The carrier 42 is shown as broken off, it being understood that it continues and passes around a guide-roller (not shown) located upon an ordinary cutting-machine, returning therefrom and comes in contact with a guide-roller 62, having its bearings mounted in the main frame 1. The carrier then descends in a vertical direction and surrounds a tightening-roller 63. This roller 63 has its bearings in a sliding frame 64, which frame is mounted in slideways 65 and on each side of the main frame. To hold the tightening-roller taut, there is provided a strap 66, which encircles a shaft 67, having its bearings in the main frame of the machine. This shaft bears a ratchet 68 just inside of the frame, which engages with a pawl 69 for preventing backward movement of the shaft and the consequent slackening of the carrier 42. The carrier 42, after passing the roll 63, returns vertically to a guide-roller 70, having its bearings in the main frame. After passing around this roller 70 it travels horizontally to a drum 71 and then vertically to another guide-roller 72, mounted in sliding bearings 73, fastened to the main frame. The object of these slide-bearings is to regulate the travel of the carrier 42, keeping it in the center of the machine.

Power is applied to the various parts of the machine as follows: Upon the driving-shaft 74 is keyed a driving-pulley 75, having a stand-bearing 76. Back of this driving-pulley is keyed a pinion 77, which engages with a large gear 78 for the transmission of motion to the sheeting-rolls 9 and 10. Keyed to the gear-wheel 78 is a shaft 79, extending across the machine and having its bearings in the main frame. Upon the opposite end of the shaft 79 is an eccentric 80, having an eccentric-strap 81 surrounding it, with a connecting-rod 82 secured thereto. At the opposite end of this connecting-rod 82 is journaled a rocking arm 83, the upper end of which is keyed to a rock-shaft 84. As the eccentric 80 moves it will cause a rocking or oscillating motion to be imparted to the shaft 84, which works in bearings 85 in the main frame 1.

Upon the extremity of the shaft 84, opposite to the arm 83, is an adjustable rock-arm 86, having an adjusting-screw 87, by which an increase or decrease of motion may be obtained as it moves the sliding stud 88 to or from the center of the shaft. To this sliding stud 88 is attached a connecting-rod 89, which extends upward and is connected to a pawl-arm 90. To this arm 90 is fastened a pawl 91, which engages with the teeth of a ratchet-wheel 92. The pawl-arm 90 surrounds and oscillates upon the shaft 93 of the sheeting-roll 9. Upon the shaft 93 is keyed a gear 94, which engages with a similar gear 95, keyed to the shaft 96 of the sheeting-roll 10. This shaft 96 is mounted in sliding bearings 97, one on each side of the preliminary sheeter 3. Upon one side of the slide-bearings 97 rests a spring 98, one end bearing on the slide-box and the other end coming in contact with the frame of the preliminary sheeter 3. The action of this spring 98 is to press the slide-bearing 97 against the adjusting or locating screws 99, which regulate the distance between the sheeting-rolls 9 and 10, giving any thickness of dough sheet required.

The action of the stamping-roll 43 is as follows: Next to the driving-gear 77 on the shaft 74 is an eccentric 100 close to the main frame of the machine, while upon the opposite side of the machine, close to the frame, is a corresponding eccentric 101. The shaft 74 has two bearings 102 in the main frame of the machine. (Shown particularly in Fig. 3.) The caps of these bearings are provided with thrust-screws 103. Said screws are tapped into the caps, having their heads in close contact with the under side of the heavy rib of the main frame of the machine. The object of these screws is to withstand the exceedingly heavy pressure produced by the motion of the eccentric upon the shaft 74. To the eccentrics 100 and 101 are attached connecting-rods 104 and 105. The upper ends of these connecting-rods are arranged with sliding bearings 106 and 107. In the center of these bearings revolves a shaft 108, to which is keyed the stamping-roll 43, before mentioned, journaled in sliding boxes mounted in the slideways 109 and 110, bolted to the top of the main frame 1. The lower sides of the sliding bearings 106 and 107 are provided with two springs 11, while upon the top of the bearings are two locating or adjusting hand-wheels 112, fastened to adjusting-screws passing through the upper portion of the connecting-rods and coming in contact with the top of the slide-bearings 106 and 107, respectively. By raising or lowering these slide-bearings within the upper portion of the connecting-rods any desired height of the stamping-roll 43 above the carrier may be obtained to give the requisite thickness to the dough sheet, the vertical movement of the roll being obtained through the medium of the eccentrics and connecting-rods.

To produce the rotation of the stamping-roll 43, there is fastened to the shaft 108 a small ratchet-wheel 113, (see Fig. 4,) the teeth of which engage with two pawls 114, fastened inside the rim of a wheel, in the edge whereof are cut a number of gear-teeth 115. This wheel rotates freely upon the shaft 108, being located closely to one end of the stamping-roll 43, between it and the slide-bearing 109. The teeth of this wheel engage with a rack 116. When the shaft 108, with the roll 43, moves upward, it will cause a rotation of the wheel 115 through the medium of the rack 116. This upward movement will cause the pawls 114 to pass over the teeth of the ratchet-wheel 113 and therefore produce no rotation of the stamping-roll 43. During the downward movement of the stamping-roll and the connected parts the wheel 115 will rotate in an opposite direction, and consequently the pawls 114 will turn the ratchet-wheel 113 during the entire downward stroke of the stamping-roll. Consequently the said roll is stationary during the upward stroke and rotates during the downward stroke. At the right-hand side of the stamping-roll 43, Fig. 3, is a flour-box 117, the bottom whereof forms a scraper for the stamping-roll and at the same time prevents the escape of flour from the box. This flour box or pocket is held in position by means of two brackets 118, connected to a cross-yoke 119, extending across the stamping-roll 43. By this arrangement the flour-box will at all times be held closely to the stamping-roll and will travel up and down with it. The object of this flour-box 117 is to keep the surface of the stamping-roll covered with flour, so it will not adhere to the sheet of dough while in the act of stamping.

Attached to the extreme end of the driving-gear shaft 74 is a slotted crank 120, which is provided with a regulating-screw 121, passing through a sliding stud 122, upon the outer end of which is a connecting-rod 123. This rod receives any desired amount of motion from the slotted crank 120 as it rotates in proportion to the distance the sliding stud 122 is from the center of the crank. Upon the opposite end of the connecting-rod 123 is a bearing 124, encircling a sliding stud 125, which stud is operated by an adjusting-screw 126, all being mounted upon the upper portion of the rock-arm 28, this arrangement giving motion to the endless carrier 21. The rock-arm 28 oscillates upon the shaft 23. Out beyond the end of the shaft 23 and extending downward is the lower portion of the rock-arm 28, which contains a second adjusting-screw 127, extending downward to the extremity of the rock-arm into a bearing 128. The object of this adjusting-screw 127 is to operate the sliding stud 129, which extends inwardly toward the main frame of the machine and engages with the end of a connecting-rod 130. Upon the other end of this connecting-rod 130 is a stud-bearing 131, working upon a stud 132, which is fastened to a rock-arm 133, at the upper end of which is a stud 134 for operating a pawl 135, which engages with a ratchet-wheel 136. A shaft 137 has its bearings in the main frame of the machine and carries the driving-drum 71, which assists in operating the second carrier 42. Upon the outer side of the stud 132 and in close connection with the connecting-rod 130 is a connecting-rod 138, operated by said rock-arm. Upon the other end of the connecting-rod 138 is a bearing 139, encircling a stud 140, which is fastened to the rock-arm 141, said arm oscillating upon the shaft 47.

Upon the inside of the rock-arm 141 is a pawl 143, which engages with the teeth of a ratchet-wheel 142, this pawl being mounted upon the stud 140. The shaft 47 turns the dusting-drum 45, said drum performing two functions, that of propelling the second carrier 42 and of covering the upper surface of said carrier with flour.

Motion for operating the upper dusting device is taken from the extreme outer end of the shaft 47 (see Fig. 1) by means of a pulley 144 and a band 145, which passes around a pulley 146, attached to the shaft of the dusting-brush, thus giving motion also to the distributing-roll 55 through the medium of a band passing around the pulleys upon the opposite extremities of the roller 55 and the shaft of the dusting-brush, as shown at the left of Fig. 2.

As the height of the preliminary sheeter makes it somewhat unhandy to place dough in the hoppers, two steps 147 and 148 are provided to enable the operator to readily obtain the required elevation for feeding the sheeter.

Having now particularly described and ascertained the nature of my said invention and in what manner the same is to be performed, what I claim as new therein, and desire to secure by Letters Patent, is—

1. In a machine of the character herein specified, a stamping or kneading roll having a simultaneous vertical, and a rotary motion, substantially as shown and described.

2. In a machine of the character herein specified, a stamping or kneading roll having a simultaneous vertical and rotary motion, in combination with a yielding bed located thereunder, substantially as shown and described.

3. In a machine of the character herein specified, a pair of sheeting-rolls and an independent kneading or stamping roll having a simultaneous rotary and vertical motion, in combination with means for conveying the dough sheet, substantially as shown and described.

4. In a machine of the character herein specified, the combination with the sheeting-rolls, of means for dusting the top of the dough sheet, as set forth, and for applying flour to the carrier by means of a hollow drum having openings therein, and around which the carrier passes, substantially as shown and described.

5. In a dough-sheeting machine of the character herein specified, an endless sheet-carrier, in combination with a hollow, rotatable drum, around which the carrier passes, said drum moving with the carrier, and being arranged to contain flour which is applied to the surface of the carrier, substantially as shown and described.

6. In a machine of the character herein specified, the combination with preliminary sheeting-rolls, of a carrier for receiving the sheet, and a single kneading or stamping roll having a simultaneous eccentric and revolving motion beneath which said carrier passes, and a support beneath said single roll and the carrier, substantially as shown and described.

JAMES H. MITCHELL.

Witnesses:
A. M. PIERCE,
F. H. PIERCE.